Sept. 8, 1964  T. R. SPECHT ETAL  3,148,308
TRANSFORMER
Filed Dec. 27, 1961

WITNESSES:
Bernard R. Giegus
Raymond C. Cheers

INVENTORS
Edward N. Henry and
Theodore R. Specht.
BY
F. E. Browder
ATTORNEY

United States Patent Office 3,148,308
Patented Sept. 8, 1964

3,148,308
TRANSFORMER
Theodore R. Specht, Sharon, Pa., and Edward N. Henry, Ellicott City, Md., assignors to Westinghouse Electric Corporation, East Pittsburgh, Pa., a corporation of Pennsylvania
Filed Dec. 27, 1961, Ser. No. 162,523
3 Claims. (Cl. 317—14)

This invention relates in general to distribution transformers and more particularly to protection devices for autotransformer distribution systems.

In residential power supply systems an autotransformer is used to transform the 240 volts provided for the major appliance loads to 120 volts for the small appliance and lighting loads. In power systems of this type a burn out or open circuit fault in the common winding portion of the autotransformer causes an increase in the voltage at the load connected across the common section of the transformer. The increased voltage presents a hazard to the small appliance load and the consumer.

It is therefore a general object of this invention to provide a new and improved residential electric power distribution system.

It is a more particular object of this invention to provide a new and improved residential electric power distribution system having a device thereon for protecting the small appliances and the consumer from overvoltage hazards.

Briefly, the above cited objects are accomplished by providing a secondary winding voltage sample to a voltage responsive device which is operable to short-circuit the primary winding of the transformer on the occurrence of an overvoltage at the common winding load. The short-circuit on the primary winding causes the fuse or other current sensitive device connected between the power source and the transformer to operate thereby removing the voltage from the autotransformer and the load.

Further objects and advantages of the invention will become apparent as the following description proceeds and features of novelty which characterize the invention will be pointed out in particularity in the claims annexed to and forming a part of the specification.

For a better understanding of the invention, reference may be had to the accompanying drawings in which.

Figure 1:
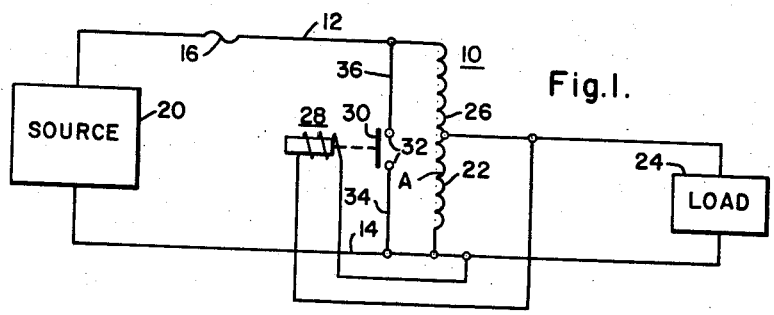
FIG. 1 is a schematic diagram of a residential electric power distribution system.

Referring now to the schematic diagram of FIG. 1, an autotransformer 10 is connected between the input conductors 12 and 14. The input conductor 12 is connected through a current sensitive switch, such as a circuit breaker or fuse 16, to a 240 volt alternating current source 20. The source 20 would also supply power to the major appliances in a residential power distribution system. The common winding portion 22 of the autotransformer 10 supplies the 120 volt alternating current for the lighting and small appliance loads indicated generally as a load 24. In the event of an open circuit in the common winding portion 22, for example, by a burnout at A, a circuit to the load 24 would still be complete from the 240 volt source 20 through the upper or series winding portion 26 of the autotransformer 10 to the load 24. The voltage impressed across the load 24 is substantially increased presenting hazardous conditions to the small appliances and consumers using the low voltage output from the common winding 22 of the autotransformer 10. However, the winding of a voltage sensitive relay 28, having contacts 30 and 32, is connected in parallel circuit relationship with the load 24. The increased voltage at the load 24 is thereby applied to the winding of the relay 28 causing the relay to close the contacts 30 and 32. The closed contacts 30 and 32 place an electrical short-circuit directly across the autotransformer 10 through conductors 34 and 36 causing the fuse 16 to blow which disconnects the autotransformer from the source of voltage 20 to thereby prevent the hazard of overvoltage to the consumer of the lighting and small appliance power.

Figure 2:
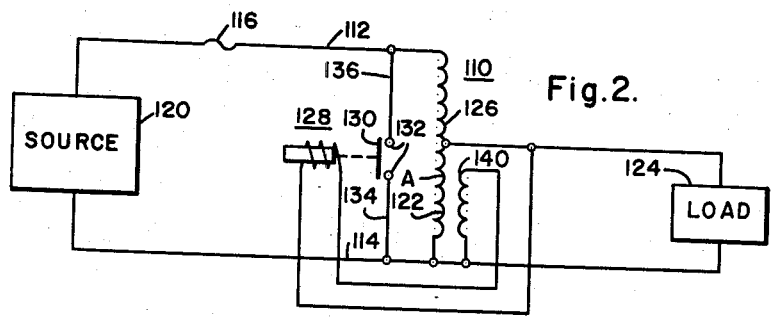
FIG. 2 is a modified embodiment of the electric power distribution system of FIG. 1.

FIG. 2 is a schematic diagram of the distribution system showing a modification of the protection circuit. An auxiliary winding 140 is provided in series with the relay winding. The series circuit combination of the auxiliary winding 140 and the relay winding is connected in parallel circuit relationship with the load 124. In this configuration the auxiliary winding 140 is connected in magnetic opposition with the autotransformer 110, so the normal voltage applied to the winding of the relay 128 is substantially zero. In the event an open circuit fault in the common winding 122 occurs, for example at A, the exciting current path through winding 122 is interrupted and the induced voltage from the autotransformer 110 to the auxiliary winding 140 decreases which causes the voltage at the load 124 to increase. With no current in the winding 122 there is no magnetic flux to induce a voltage in opposition to the voltage of winding 140. The voltage applied to the winding of the relay 128 increases causing the contacts 130 and 132 to close thereby short-circuiting the autotransformer 110 through conductors 134 and 136 causing the fuse 116 to blow. This, of course, disconnects the autotransformer 110 from the source 120 which prevents an overvoltage to the load 124.

Figure 3:
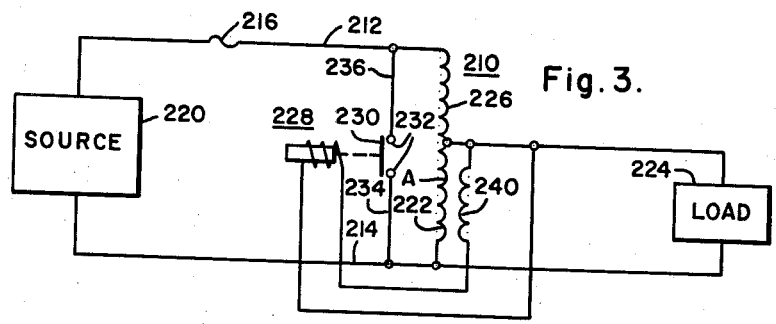
FIG. 3 is a second modified embodiment of the electric power distribution system of FIG. 1.

FIG. 3 is a schematic diagram of the distribution system showing another modification of the protective circuit. This arrangement uses an auxiliary winding 240 to actuate a relay 228. The relay 228 is a normally closed relay which is held open by a voltage induced in the auxiliary winding 240 by the autotransformer 110. A burnout or open circuit fault in the common winding 222 removes the voltage from the auxiliary winding 240 which causes the relay contacts 230 and 232 to return to the normally closed position and short-circuit the autotransformer 210 through the short-circuiting conductors 234 and 236. The short-circuit causes the fuse 216 to blow thereby removing the source of electrical energy 220 from the autotransformer 210 and the load 224.

Figure 4:
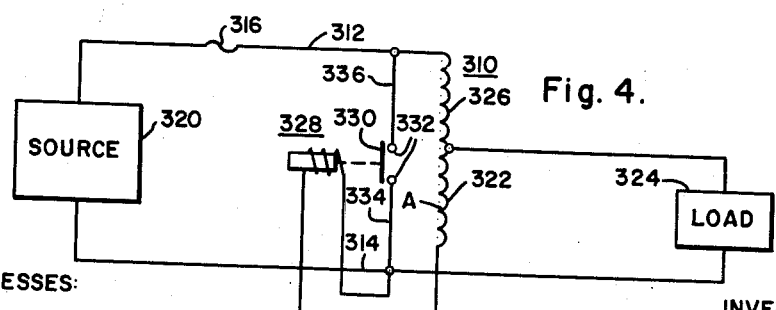
FIG. 4 is still another embodiment of the electric power distribution system of FIG. 1.

Still another embodiment of the present invention is shown in FIG. 4. In this view the load 324 is connected in parallel circuit relationship with the serially connected common winding 322 and the winding of the relay 328. The relay 328 is a normally closed relay. That is, the contacts 330 and 332 are in electrical connection in the absence of a voltage on the relay winding. A source of electrical energy 320 is connected in parallel circuit relationship with the serially connected autotransformer 310 and the winding of the relay 328. The load 324 is connected in parallel circuit relationship with the serially connected common winding 322 and the winding of the relay 328. An open circuit in the common winding 322 opens the current path through the winding of the normally closed relay 328 allowing the relay contacts 330 and 332 to close to thereby short-circuit the autotransformer 310 through conductors 334 and 336 which causes fuse 316 to blow thereby disconnecting the source of voltage 320 from the autotransformer 310 and the load 324.

While there have been shown and described what are at present considered to be preferred embodiments of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

We claim as our invention:

1. A power distribution system comprising an autotransformer having first and second winding portions; a source of alternating potential connected in circuit relation with said first and second winding portions; a load circuit connected in circuit relation with said second winding portion; voltage responsive circuit opening and closing means connected across said first and second winding portions; an auxiliary winding disposed in inductive relation with said second winding portion; said auxilary winding being connected in circuit relation with said voltage responsive circuit opening and closing means, said second winding portion, and said load circuit; said voltage responsive circuit opening and closing means completing an electrical circuit across said first and second winding portions in response to an open circuit condition in said second winding portion.

2. A power distribution system comprising, an autotransformer having first and second winding portions; a source of alternating potential connected in series circuit relation with said first and second winding portions; a load circuit connected in series circuit relation with said second winding portion; a relay having a winding and normally open electrical contacts; an auxiliary winding disposed in inductive relation with said second winding portion; said auxiliary winding and said relay winding being serially connected; said serially connected auxiliary and relay windings being connected in parallel circuit relation with said second winding portion and said load circuit, with said auxiliary winding being connected in magnetic opposition to the voltage across said load circuit to apply substantially zero voltage to said relay winding; said relay contacts being connected across said first and second winding portions; said relay winding being energized by the voltage across said load circuit when said second winding portion sustains an open circuit condition, causing said relay contacts to close and short circuit said first and second winding portions.

3. A power distribution system comprising, an autotransformer having first and second winding portions; a source of alternating potential connected in series circuit relation with said first and second winding portions; a load circuit connected in series circuit relation with said second winding portion; a relay having a winding and normally closed electrical contacts; an auxiliary winding disposed in inductive relation with said second winding portion; said auxiliary winding and said relay winding being serially connected; said serially connected auxiliary and relay windings being connected in circuit relation with said second winding portion, with said auxiliary winding being connected to apply voltage to said relay winding; said relay contacts being connected across said first and second winding portions; said relay winding being de-energized when said second winding portion sustains an open circuit condition, causing said relay contacts to close and short circuit said first and second winding portions.

References Cited in the file of this patent

UNITED STATES PATENTS

| | | |
|---|---|---|
| 863,163 | Eveleth | Aug. 13, 1907 |
| 1,677,692 | Stokes | July 17, 1928 |
| 1,799,689 | Jones | Apr. 7, 1931 |

FOREIGN PATENTS

| | | |
|---|---|---|
| 2,772 | Great Britain | Feb. 24, 1888 |